United States Patent Office 2,982,337
Patented May 2, 1961

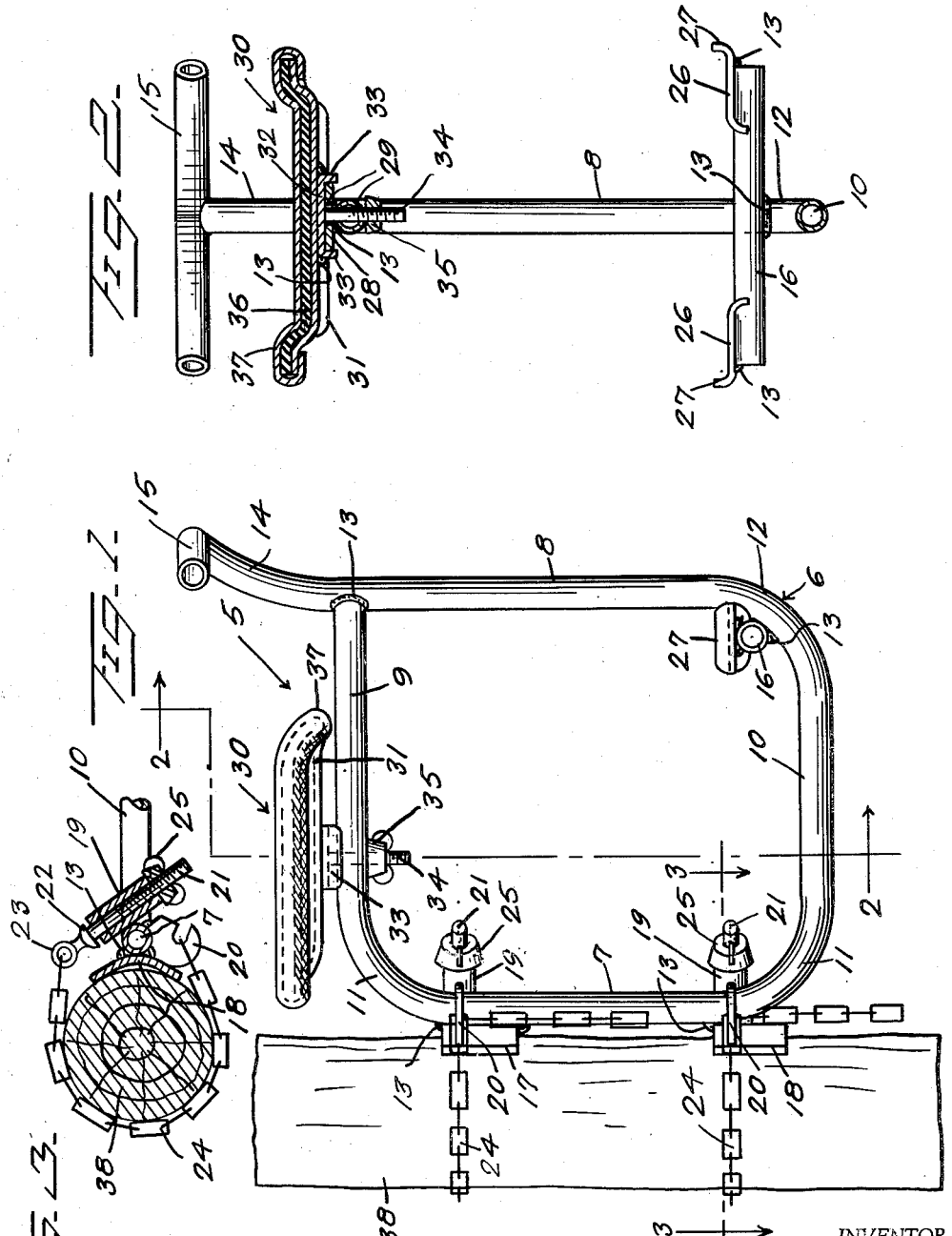

2,982,337
TREE SEAT
Joseph E. Arena, 50 Main Road, Hammonton, N.J.
Filed Nov. 10, 1958, Ser. No. 773,043
4 Claims. (Cl. 155—78)

This invention relates to a novel supporting structure primarily adapted for supporting a hunter in a tree or otherwise in an elevated position.

In hunting deer, wild turkeys and other animals and some birds, if the hunter can position himself in an elevated position this can be of greater advantage than moving about since the hunter is afforded better visibility of the game, the game is less likely to get the scent of the hunter and is less likely to see the hunter, since hunted game usually look for danger on the ground and not above the ground. In addition, the hunter is much safer as there is much less likelihood of being accidentally shot by the stray bullet of another hunter.

Accordingly, it is a primary object of the present invention to provide a supporting structure which may be readily secured to a tree for conveniently and comfortably supporting a hunter at a desired elevation above the ground and from which the hunter can conveniently fire a rifle or shotgun from either a sitting or standing position.

Still another object of the invention is to provide such a supporting structure which can be conveniently used for observing and studying wild animals and certain birds or for photographing such game.

Various other objects and advantages of the invention will hereinafter become more fully apparent from the following description of the drawing, illustrating a presently preferred embodiment thereof, and wherein:

Figure 1 is a side elevational view of the tree seat shown in an applied position;

Figure 2 is a vertical sectional view thereof, taken substantially along the line 2—2 of Figure 1, and Figure 3 is a horizontal sectional view, taken substantially along a plane as indicated by the line 3—3 of Figure 1.

Referring more specifically to the drawing, the tree seat in its entirety is designated generally 5 and includes a rigid frame, designated generally 6, including a substantially upright rear portion 7, a substantially upright front portion 8, and substantially horizontal top and bottom portions 9 and 10, respectively. The ends of the upright rear portion 7 are integrally joined with the inner or rear ends of the top portion 9 and bottom portion 10 by curved corner portions 11. The forward end of the bottom portion 10 is integrally connected by a curved corner portion 12 to the lower end of the front portion 8. The forward end of the top portion 9 is secured to a part of the front portion 8 in any suitable manner, as by welding, as seen at 13. The front frame portion 8 has a forwardly curved upper portion 14 extending upwardly from the top portion 9, to the upper end of which is fixed the intermediate portion of a curved crossbar 15 forming a handle and body rest and having a concavely bowed inner side. The frame 6 also includes a bottom cross member 16 which is secured intermediate of its ends, as by welding, as seen at 13, to the inner side of the lower corner 12 and so as to be disposed crosswise of the front part 8 and bottom part 10, as best seen in Figure 2. The frame parts previously described are preferably of tubular construction to minimize the weight thereof and are of adequate thickness and strength to readily support the weight of a man.

Two vertically disposed corresponding saddle members 17 and 18 are secured, as by additional welds 13, to the outer side of the rear frame portion 7, in vertically spaced relation to one another. Said saddle members 17 and 18 have outwardly or rearwardly facing concave sides, as best seen in Figure 3. The saddle members 17 and 18 are bowed horizontally, for a purpose which will hereinafter become apparent. The rear frame portion 7 has two vertically spaced tubular members 19 welded or otherwise secured thereto, as by additional welds 13, and which are disposed adjacent the saddle members 17 and 18 but on the forward side of the rear frame portion 7 and at an oblique angle to the plane of the frame 6. Two hook members 20 are also secured as by welds 13 to said rear frame portion 7, in the same horizontal planes as the rigid sleeves 19, on the forward sides of the saddle members 17 and 18 and spaced from and at an angle to the tubular members 19. Said hooks 20 open forwardly of the frame 6, as seen in Figure 3.

Bolts 21 extend loosely in a forward direction through the tubular members or sleeves 19 and have heads 22 at their rear ends provided with eyes 23. An end of a chain or other flexible member 24 is secured to the eye 23 of each bolt 21. A wing nut 25 threadedly engages the forward end of each bolt 21.

Foot plates 26 are secured, as by additional welds 13, to the upper side of the ends of the bottom cross member 16 and are preferably provided with upturned remote ends 27 to prevent the feet from slipping outwardly off of said foot plates.

A rigid plate 28 is secured, as by additional welds 13, to the upper side of the top frame portion 9, and is preferably disposed nearer the upper rear corner 11 than the front frame portion 8. As seen in Figure 2, said plate 28 and the frame portion 9 are provided with aligned openings 29.

A seat, designated generally 30, is supported on the top bar 9 and includes a rigid body or base portion 31, preferably formed of metal, having a plate 32 suitably secured, as by additional welds 13, to the underside of a central portion of the part 31. Said plate 32 has downturned side edges forming spaced substantially parallel flanges 33. A bolt 34, forming a seat post, is anchored to and extends downwardly from the plate 32 midway between the flanges 33. The bolt or post 34 extends loosely through the openings 29, and a wing nut 35 is threadedly connected to the lower end of said bolt 34 and is tightened against the underside of the top bar 9, for securing the plate 32 flush on the plate 28 and with the flanges 33 straddling the side edges of said plate 28, to prevent the seat 30 from turning relative to the frame 6. The upper side of the body portion or base 31 is covered by a resilient pad 36, preferably formed of sponge rubber, and a fabric covering 37 is disposed over the pad 36 and is secured in any conventional manner around the edges of the body member 31 to complete the seat 30.

The tree seat 5 is adapted to be mounted on a tree trunk 38 or other upright support, such as a pole, by positioning the saddle members 17 and 18 against a part of the three trunk or pole, with the saddle member 17 disposed above the saddle member 18. The wing nuts 25 are then loosened, after which the chains 24 are stretched around the three trunk 38 and a link of each chain 24 is engaged with a hook 20, which is disposed at substantially the same level as said chain, as illustrated in Figures 1 and 3. The chains 24 are engaged with the hooks 20 so as to tension the chains as much as possible, after which the wing nuts 25 are tightened for drawing the bolts 21 forwardly through the sleeves 19 to further tension the chains 24 for securing the tree seat 5 immovably to the tree trunk or support 38, and so that the frame 6 will project outwardly in a desired direction and will be positioned at a desired elevation.

The hunter or user assumes a position sitting upon the seat 30, facing away from the tree trunk or support 38 with his feet resting upon the foot rests 26. In this position the user, if a hunter, can readily fire a rifle or shotgun from a sitting position or from a standing position by standing upon the foot rests 26 with his legs resting against the end portions of the handle 15. The seat 5 may also be used for serving or photographing wild animals and other game and can be positioned to give the user a good field of view of the surrounding area; and as it is disposed above the ground, wild animals and other game will not be as likely to get the scent of or see the user.

The tree seat 5 is sufficiently light in weight so that it can be conveniently carried and can be quickly and easily secured to a tree trunk or other support. The weight of the occupant or user will tend to cause the frame to fulcrum downwardly and to the right relative to its position of Figure 1, about the bottom edge of the lower saddle member 18, for causing said saddle member and the two chains 24 to assume a tight binding engagement with the tree trunk or support 38.

Various modifications and changes are contemplated and may be resorted to, without departing from the function or scope of the invention as hereinafter defined by the appended claims.

I claim as my invention:

1. A seat structure comprising a rigid frame including an upright rear frame part, an upright forward frame part and vertically spaced top and bottom frame parts extending between and connecting said front and rear frame parts, rigid saddle members fixed to the outer rear side of said rear frame part in vertically spaced relation to one another and bearing against an upright support, flexible members detachably and adjustably connected to said rear frame part, adjacent the saddle members, and disposed around said support, means tensioning said flexible members for securing the frame rigidly to the support, a seat member mounted on and secured to said top frame part and facing toward and spaced from said front frame part, and transversely spaced foot rests supported by and disposed on opposite sides of the frame beneath and forwardly of said seat member.

2. A seat structure as in claim 1, said frame including an upwardly and forwardly curved extension of said front frame part, and a rigid handle member secured to the upper end of said extension and extending laterally therefrom in opposite directions relative to said extension, said handle being disposed above and forwardly of the seat member and providing a combined handle and leg rest.

3. A seat structure comprising a rigid frame having an upright rear part, vertically spaced saddle members rigidly secured to the outer or rear side of said rear part and engaging against an upright support, nonelastic flexible members extending around said support adjacent the saddle members, means detachably and adjustably connecting end portions of said flexible members to said rear frame part for tensioning the flexible members around the support for securing the frame rigidly thereto, said frame including a top member rigidly supported by and extending forwardly from said rear part, in a direction away from the support, said frame having an upright front part rigidly secured to said top member, a seat member mounted on and supported by said top member and facing toward and spaced from said front part, and foot rests rigidly supported by said frame below and forwardly of the seat member and on opposite sides of and laterally spaced from said front part.

4. A seat structure as in claim 3, and a rigid handle and leg rest secured to the upper end of said front part and extending laterally in opposite directions therefrom, said handle and leg rest being disposed above and forwardly of said seat member and having a concave rear side facing toward the seat member.

References Cited in the file of this patent

UNITED STATES PATENTS

| | | |
|---|---|---|
| 1,993,320 | Dozier | May 5, 1935 |
| 2,775,489 | Hagadorn | Dec. 25, 1956 |
| 2,838,342 | Masse | June 10, 1958 |
| 2,855,980 | Konieczka | Oct. 14, 1958 |